US010511238B2

(12) United States Patent
Jefferies et al.

(10) Patent No.: US 10,511,238 B2
(45) Date of Patent: Dec. 17, 2019

(54) TEMPERATURE-BASED DIAGNOSTICS METHOD FOR A STARTER ISLAND

(71) Applicant: Schneider Electric USA, Inc., Andover, MA (US)

(72) Inventors: Kevin M Jefferies, Raleigh, NC (US); Benjamin W Edwards, Rolesville, NC (US); Matthew L White, Cary, NC (US); Alan E Freeman, Raleigh, NC (US); Richard Karl Weiler, Wake Forest, NC (US); Konstantin Alexander Filippenko, Grenoble (FR); Julius Michael Liptak, Knightdale, NC (US)

(73) Assignee: Schneider Electric USA, Inc., Andover, MA (US)

( * ) Notice: Subject to any disclaimer, the term of this patent is extended or adjusted under 35 U.S.C. 154(b) by 219 days.

(21) Appl. No.: 15/813,534

(22) Filed: Nov. 15, 2017

(65) Prior Publication Data

US 2019/0149067 A1    May 16, 2019

(51) Int. Cl.
| | |
|---|---|
| *H02P 1/02* | (2006.01) |
| *H02P 29/64* | (2016.01) |
| *H02H 7/085* | (2006.01) |
| *H02H 7/08* | (2006.01) |
| *H02P 29/60* | (2016.01) |
| *H02P 1/16* | (2006.01) |

(52) U.S. Cl.
CPC ............ *H02P 1/022* (2013.01); *H02H 7/0822* (2013.01); *H02H 7/0852* (2013.01); *H02H 7/0855* (2013.01); *H02P 29/60* (2016.02); *H02P 29/64* (2016.02); *H02P 1/16* (2013.01)

(58) Field of Classification Search
CPC ......... H01L 2924/0002; H01L 2924/00; F02N 11/04; F02N 11/10; F02N 11/0866
See application file for complete search history.

(56) References Cited

U.S. PATENT DOCUMENTS

| | | | |
|---|---|---|---|
| 6,041,287 | A | 3/2000 | Dister et al. |
| 7,528,612 | B2 | 5/2009 | Gollhardt et al. |
| 8,032,331 | B2 | 10/2011 | Dalton et al. |
| 8,175,753 | B2 | 5/2012 | Sawczak et al. |

(Continued)

*Primary Examiner* — Jorge L Carrasquillo
*Assistant Examiner* — Zoheb S Imtiaz
(74) *Attorney, Agent, or Firm* — Locke Lord LLP (57) ABSTRACT

A method of performing temperature-based diagnostics for motor starters within a physical grouping of motor starters is performed by determining a presently expected temperature operating range for each starter based on measuring operating temperatures of the starters; measuring their current draws, and evaluating the temperature and load draw data in light of compensation values assigned for the known power ratings of the starter and the starter's physical location within the grouping. With the presently expected temperature operating range of the starter determined, and the periodic monitoring of starter temperatures, when an individual starter's temperature exceeds its expected range, a diagnostic warning will be issued for that starter and/or for the control panel itself as a guide for preventative maintenance. Alternately, the warning may be issued for an unexpected temperature rise for a given rise in current draw, or for values exceeding an expected rate of temperature change.

10 Claims, 5 Drawing Sheets

(56) References Cited

U.S. PATENT DOCUMENTS

| | | |
|---|---|---|
| 8,706,314 B2 | 4/2014 | Lewis et al. |
| 8,791,595 B2 | 7/2014 | Chou et al. |
| 9,391,495 B2 | 7/2016 | Wilson et al. |
| 2010/0101522 A1* | 4/2010 | Ge ................ F02N 11/0855 123/179.3 |
| 2012/0092180 A1 | 4/2012 | Rikkola et al. |
| 2013/0029578 A1 | 1/2013 | Wang |
| 2015/0005949 A1* | 1/2015 | Haridass ............ G06F 1/206 700/275 |
| 2016/0107768 A1 | 4/2016 | Nicks et al. |
| 2016/0245217 A1* | 8/2016 | Takeuchi ........... F02M 21/0221 |

* cited by examiner

TEMPERATURE-BASED DIAGNOSTICS METHOD FOR A STARTER ISLAND

BACKGROUND OF THE INVENTION

Field of the Invention

The present invention relates to the management of preventative maintenance by diagnosing possible motor starter or industrial control panel problems through the monitoring the temperature behavior of motor starters in a group.

Discussion of the Art

A motor starter, also known as just a "starter," is the control device dedicated to an electric motor and typically comprising an overload relay and a contactor, as is known in the art. A group of closely associated starters; located in proximity in the same environment is sometimes referred to as a "starter island." It is often the case that a plurality of motors are grouped together in functional units to control several tasks within a function and there will be a plurality of starters grouped together in a common location such as in a cabinet remote from the motors. Examples may include a conveyor line with multiple sections, manufacture of an item with multiple operations requiring different motors, etc. More broadly, the starters in a starter island are often located in control panels. As known to those in the art, industrial control panels are an assembly of two or more power circuit components, control circuit components, or any combination of power and control circuit components. Industrial control panels are typically enclosed assemblies of industrial control equipment, such as motor controllers, switches, relays and auxiliary devices. The panels may include disconnect means and motor branch-circuit protective devices. Control panels are intended for general-use industrial applications for the control of heaters, lighting, motors, pump loads, industrial machinery, cranes, refrigeration equipment and fountains or a combination of these loads.

Because overheating of starters and motors represents a large expense in lost energy, replacement costs, and downtime, etc. to the operator, preventive maintenance for the starters and motors is a practical necessity. More and more today, it is desired to use less space to accommodate electrical distribution and control equipment. Increasing density in the physical placement of the starters may increase the incidence of heat problems.

In the known art, heat protection for starters is accomplished by a simple "limit and trip" approach whereby a temperature limit is set and the motor is shut down if it exceeds the temperature, i.e. the typical temperature protection is a simple threshold-cross function, executed by devices in isolation. However, this manner of protection is ad hoc and does not present much functionality for preventative maintenance purposes.

SUMMARY

The present invention recognizes that an unexpected temperature rise in a starter will generally indicate some problem in the chain of motor operations which may need maintenance or corrective action. Aspects of the present invention therefore provide a method of performing temperature-based diagnostics for preventative maintenance on starters and control panels, by monitoring the starters for expected thermal behavior in accordance with their physical characteristics and location within the grouping of motor starters (starter island). An expected range of operating temperatures is provided on an updated basis against which to judge actual temperature behavior of individual starters.

In certain aspects of the present invention a method according to the present invention may be performed by determining the expected temperature operating range for each starter based on: measuring operating temperatures of the starters within the group; measuring their load, i.e. the current draw therethrough, and evaluating the temperature and load data in light of the known starter ratings and a starter's physical location within the island group. As the temperature operating range is determined the system will continually monitor starter temperatures. If an individual starter's temperature exceeds its expected range, a diagnostic warning, i.e. alarm, will be issued to the operator.

As compared to the known art, the question asked by the diagnostics of the present invention is not: "is a starter over-heating beyond some design limits?" but rather: "is a starter temperature within expected limits given its environment, the behavior of other starters in the same environment, and how it is being used, so as to be indicative or predictive of a starter or control panel malfunction?"

In one aspect of the present invention starter island physical data may be used with an added time component to diagnose starters by expected changes over time to determine an expected correlation between starter load changes and starter temperature changes, where the question is: "is the temperature of one device changing in an expected way given the environment, the trends of other devices in the same environment, and how it is being used?"

In another aspect of the present invention similar data may be used with an added time component to diagnose starter or associated motor problems by unexpected rates of change in starter operating temperature. For example an instantaneous drop of twenty degrees Celsius (20° C.) in starter temperature may still be within an acceptable absolute range, but detecting such a drop may indicate a need to check the functioning of the broader system.

In each of these aspects, as the expected temperature behavior range for an individual starter within the starter island is determined, the system will continue monitoring starter temperatures and if an individual starter unit's temperature behavior exceeds its expected range, a diagnostic alarm can be issued for that starter or devices associated with that starter.

Thus, according to the present disclosure there is presented a method of performing temperature-based diagnostics for a motor starter grouped within a plurality of motor starters within a starter island; comprising: a) calculating an expected range of operating temperatures for the motor starter using recorded and accessed data including: b) measuring and recording internal operating temperatures of the motor starter in an electronic device associated with the plurality of motor starters, and calculating an average operating temperature for the motor starter, c) assigning an initial range of temperature values around the average operating temperature based on a given distribution range for the design of the motor starter; d) adjusting the initial range based on the physical location of the motor starter within the island to a second temperature range; e) adjusting the second temperature range to an expected temperature range based on the current draw data of the motor starter; f) periodically adjusting the expected temperature range of the motor starter based on a present average operating temperature and present current draw data for the motor starter; g) periodically measuring the motor starter temperature; and h) issuing a diagnostic alarm when a present measured temperature of a starter is outside of a present expected range of operating temperatures for the motor starter. Further, the method recited may include wherein the expected temperature range is further adjusted according to a correlation of changes in starter temperature with changes in current draw through the starter over time, whereby if the starter temperature changes too much for a given load change, the diagnostic alarm is issued. Further, the method recited may also include wherein the expected temperature range is further adjusted according to a rate of change in starter temperature over elapsed time whereby if temperature rate of change is too rapid the diagnostic alarm is issued. Further, the method recited may include wherein an expected temperature range is calculated for each of the plurality of motor starters within the starter island. Any method recited may additionally include wherein the step of adjusting the initial range based on the physical location of the motor starter within the island to a second temperature range further includes: adjusting the temperature range based upon known temperatures or temperature changes of other motor starters grouped within the plurality of motor starters. Likewise, any method recited may additionally include wherein the step of adjusting the initial range based on the physical location of the motor starter within the island to a second temperature range further includes: adjusting the temperature range based upon known current draw or current draw changes of other motor starters grouped within the plurality of motor starters.

BRIEF DESCRIPTION OF THE DRAWINGS

The foregoing and other advantages of the disclosed embodiments will become apparent upon reading the following detailed description and upon reference to the drawings, wherein.

DETAILED DESCRIPTION

As an initial matter, it will be appreciated that the development of an actual commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

Words of degree, such as "about," "substantially," and the like are used herein in the sense of "at, or nearly at, when given the manufacturing, design, and material tolerances inherent in the stated circumstances" and are used to prevent the unscrupulous infringer from unfairly taking advantage of the invention disclosure where exact or absolute figures and operational or structural relationships are stated as an aid to understanding the invention.

Figure 1:
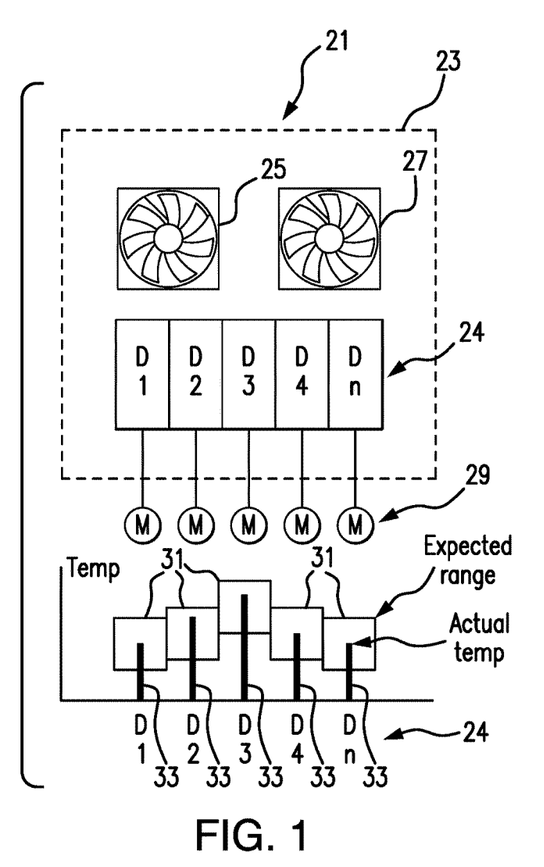
FIG. 1 is a schematic illustration of the temperature diagnostics for a starter island with several starters in situ within a cabinet having two cooling fans.
Figure 2:
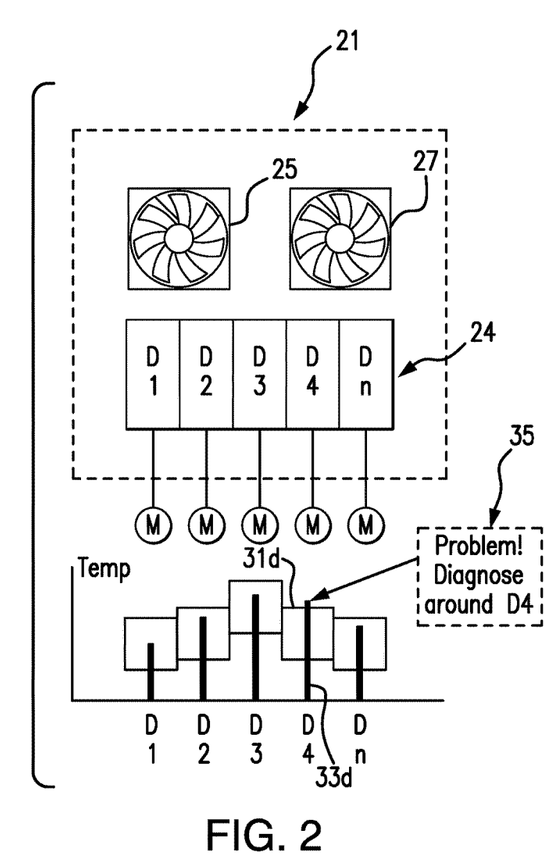
FIG. 2 is a schematic illustration of the temperature diagnostics for a starter island with several starters in situ within a cabinet having two cooling fans where one of the cooling fans has failed.

FIG. 1 shows a starter island 21 with a cabinet 23 containing a plurality of motor starters D1-D4 and up to Dn, collectively 24, physically grouped together in a row, with the cabinet 23 also having first and second cooling fans 25, 27 respectively. Each starter 24 will have a motor, collectively 29, associated therewith. According to this first aspect of the invention each of the starters 24 will have an associated expected temperature range collectively 31 at which it will operate calculated for it, and an actual operating temperature 33 which can be measured from sensors in the starters. Referring to FIG. 2, the second cooling fan 27 is indicated as not operational, thereby causing a rise in the actual operating temperature 33d of starter D4 above its expected temperature range 31d, thus causing a warning 35 to issue for maintenance purposes. The specific implementation of the monitoring and warning electronics can be left to the discretion of the designer of ordinary skill in the art.

Figure 3:
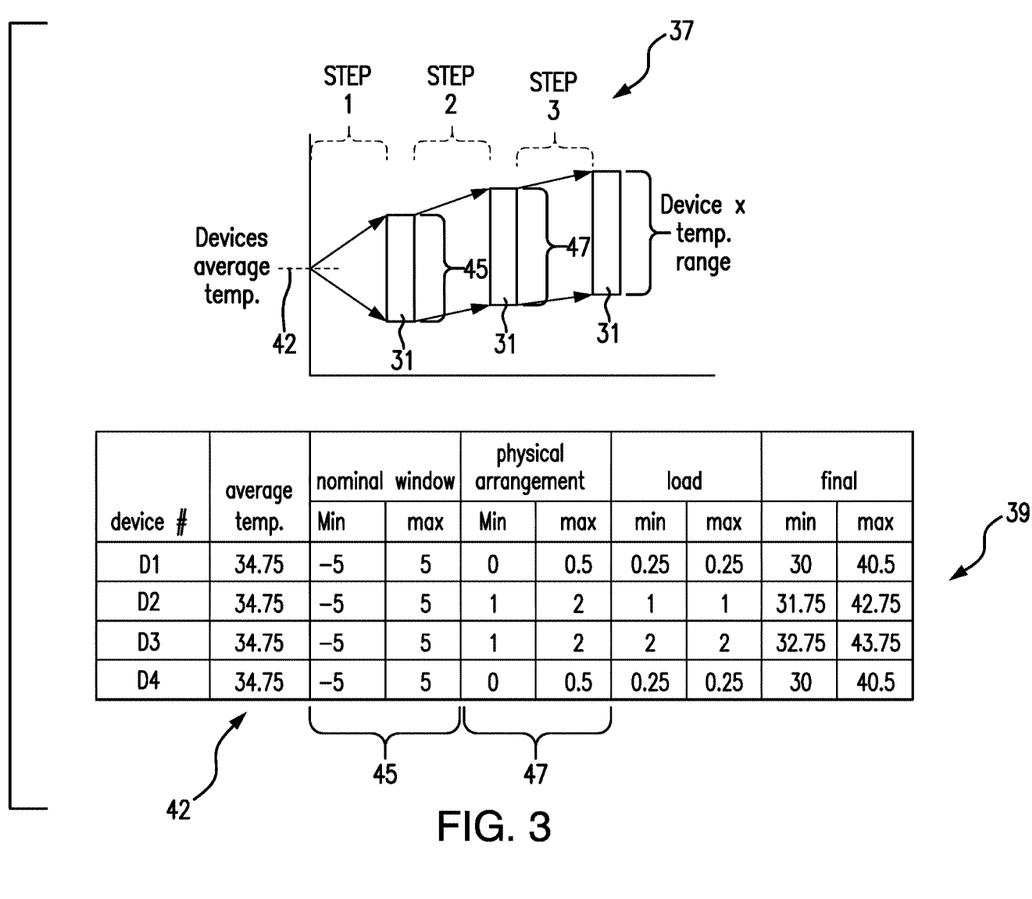
FIG. 3 is a general illustration of the process for obtaining an expected operating temperature range with a chart of hypothetical values, for each of a group of adjacent starters such as in FIGS. 1 and 2.
Figure 4:
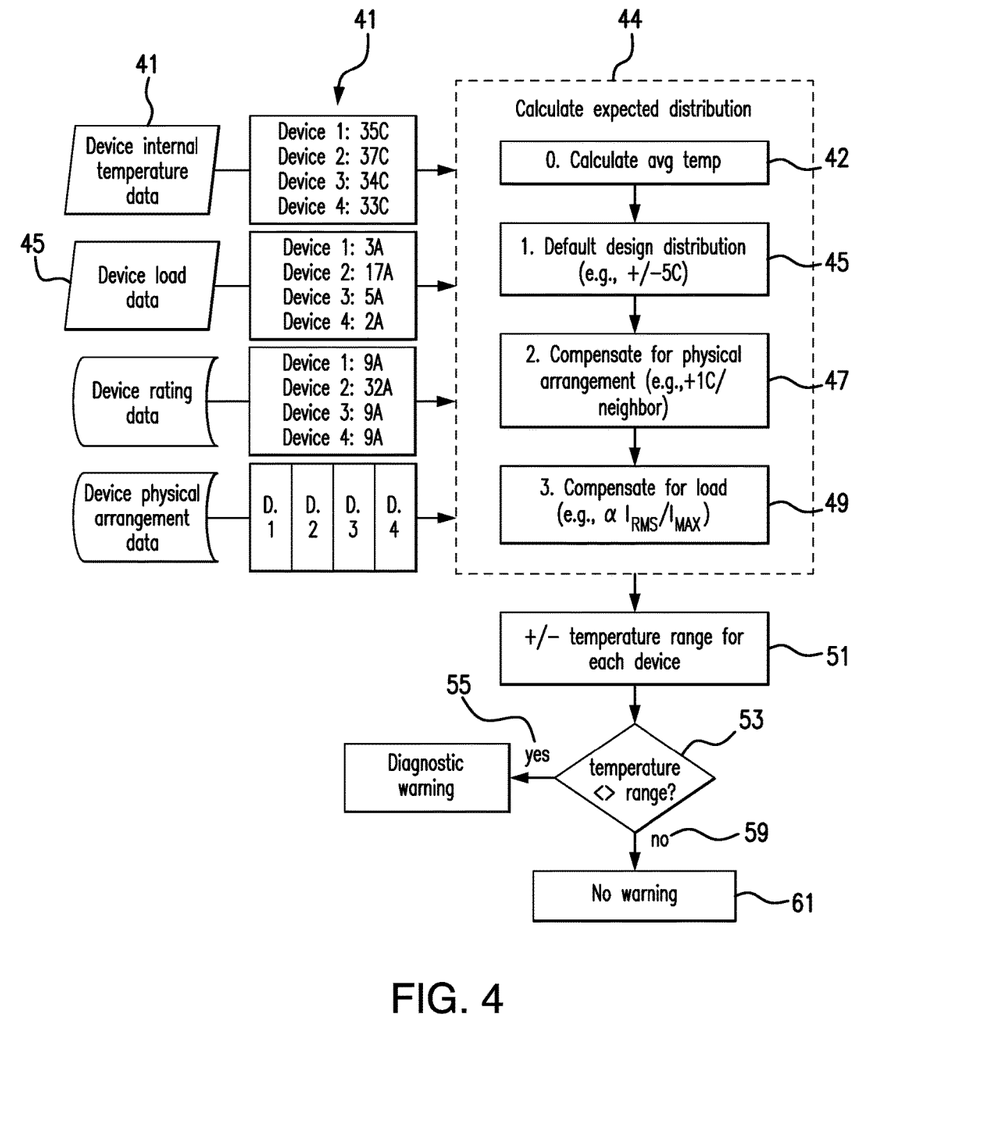
FIG. 4 is a block diagram of steps for obtaining an expected operating temperature range such as in FIG. 3 and issuing a diagnostic warning based thereon.

FIG. 3 shows a graph 37 illustrating the steps to derive the expected temperature range 31 of a starter 24, and a table 39 of exemplary values for the process as further illustrated by FIG. 4. As detailed in FIG. 3 and FIG. 4, data including the actual temperature of a starter may be collected 41 from one or more temperature sensors (not shown) within the starter and entered into a microprocessor 44, or like electronic devices associated with the starters having the processing and memory components as necessary for the stated tasks, where an average temperature 42 is calculated for the starter. A default design distribution range 45 of operating temperatures surrounding the actual temperature is taken at Step 1 from established data such as the manufacturers device load (rating) data 45. The rating data is entered to the processor 44 as at 45 to establish the initial temperature range. The range is adjusted by algorithm at Step 2, by increasing the whole range up 1° C. (one degree C.) for example for each neighboring starter whose heat will raise the temperature in and around the subject starter. For example, starters D2 and D3 are each surrounded on both sides by neighboring starters so the range is adjusted up 2° C. (two degrees C.) to establish a higher range 47. At Step 3 the range 31 is again adjusted at the processor by the algorithm taking into account the actual (motor) load 49 which the subject starter is driving, again increasing the range 31 upwardly in value.

So, for example if one looks at the range adjustments (FIG. 3) for starter devices D2 and D3, both start with an average temperature of 34.75 degrees and have a expected default range 45 of +/−5 degrees C. from that 34.75 according to their designs. Both devices have the same number of neighbors so the minimum and maximum for their temperature range are adjusted 1 and 2 degrees respectively. However, D3 is operating a higher load and therefore at Step 3 its range is adjusted upwardly and higher than that of D2 by one degree C. The adjustments to the operating temperature range according to the present algorithm might be done by any suitable method such as calculation or look up table, as desired.

Ultimately, an expected temperature range is developed and recorded 51 for each starter in the island according to its individual constraints, data values and placement within the starter island. The Operating Temperature of each starter is periodically and routinely taken and compared 53 to the recorded value of its range. If the operating temperature is outside of the range 55, e.g. as illustrated for D4 in FIG. 2, a diagnostic warning 57 is issued to the operator of the starter island so that effective preventive maintenance or investigation may be begun. If the starter operating temperature is inside of the range 59, a diagnostic warning is not issued 61.

Figure 5:
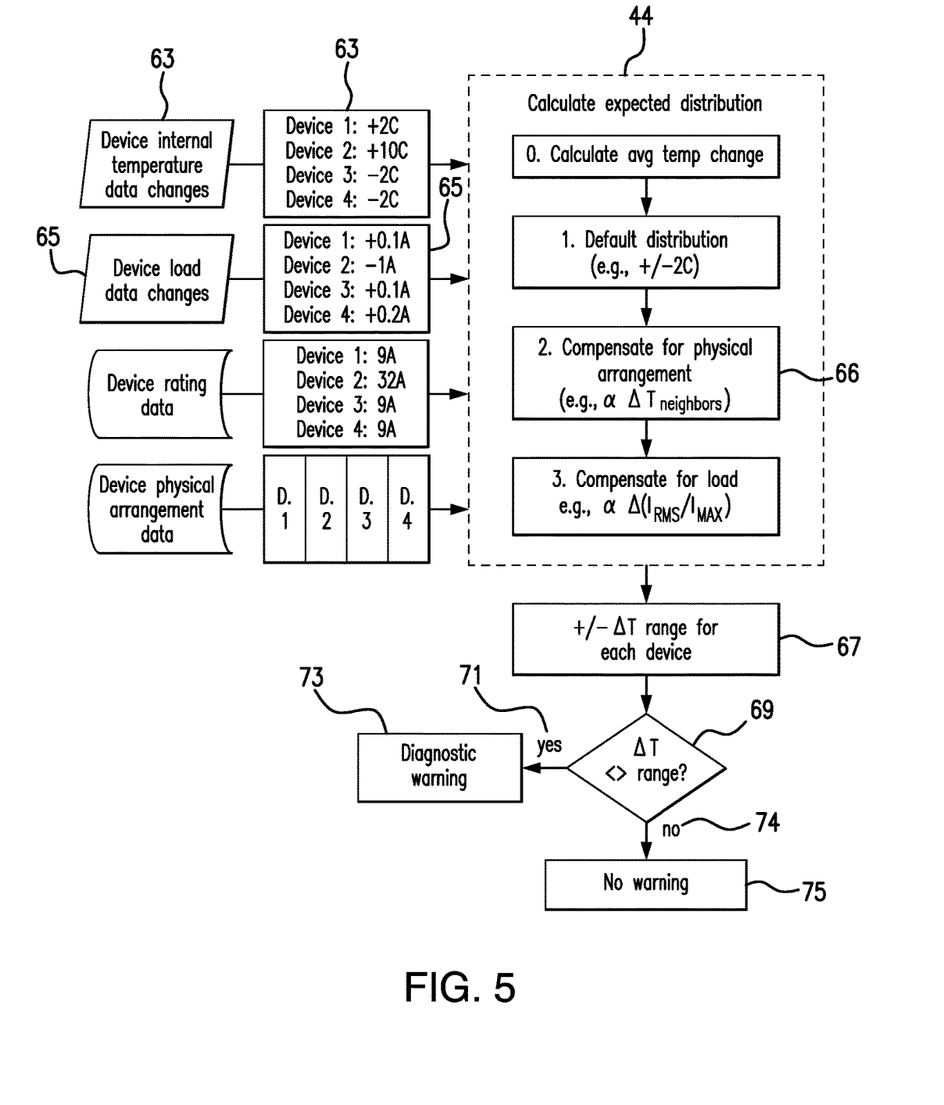
FIG. 5 is a block diagram of steps in second embodiment for obtaining an expected operating temperature range and issuing a diagnostic warning based on operating temperature change.

FIG. 5 illustrates a second embodiment of the invention whereby the same data is collected, but rather than absolute values, the temperature changes are tracked 63 against the change in operating load 65 over time whereby an expected correlation of temperature change from a change in operating load is developed 67. Further, as at step 66 indicated in both FIG. 5 and FIG. 6, while one can get along with the basic algorithm of FIG. 4 which just uses a +/−1° C. adjustment per neighbor, the algorithm for each embodiment may benefit by taking into account the temperature and/or current consumption of its neighbors, i.e. other motor starters grouped within the plurality of motor starters, in order to further refine the expected temperature range of the individual starters. In place of absolute values, the changes to these values may be used, since any of these values may affect the expected operating temperature range of the subject starter. Load and Operating Temperature of the starter are periodically and routinely taken and compared 69 to the recorded value of the correlation range. If the operating temperature-to-load change correlation is outside 71 of the correlation range, a diagnostic warning 73 is issued to the operator of the starter island so that effective preventive maintenance or investigation may be begun. If the starter operating temperature is inside 74 of the correlation range, a diagnostic warning is not issued 75.

Figure 6:
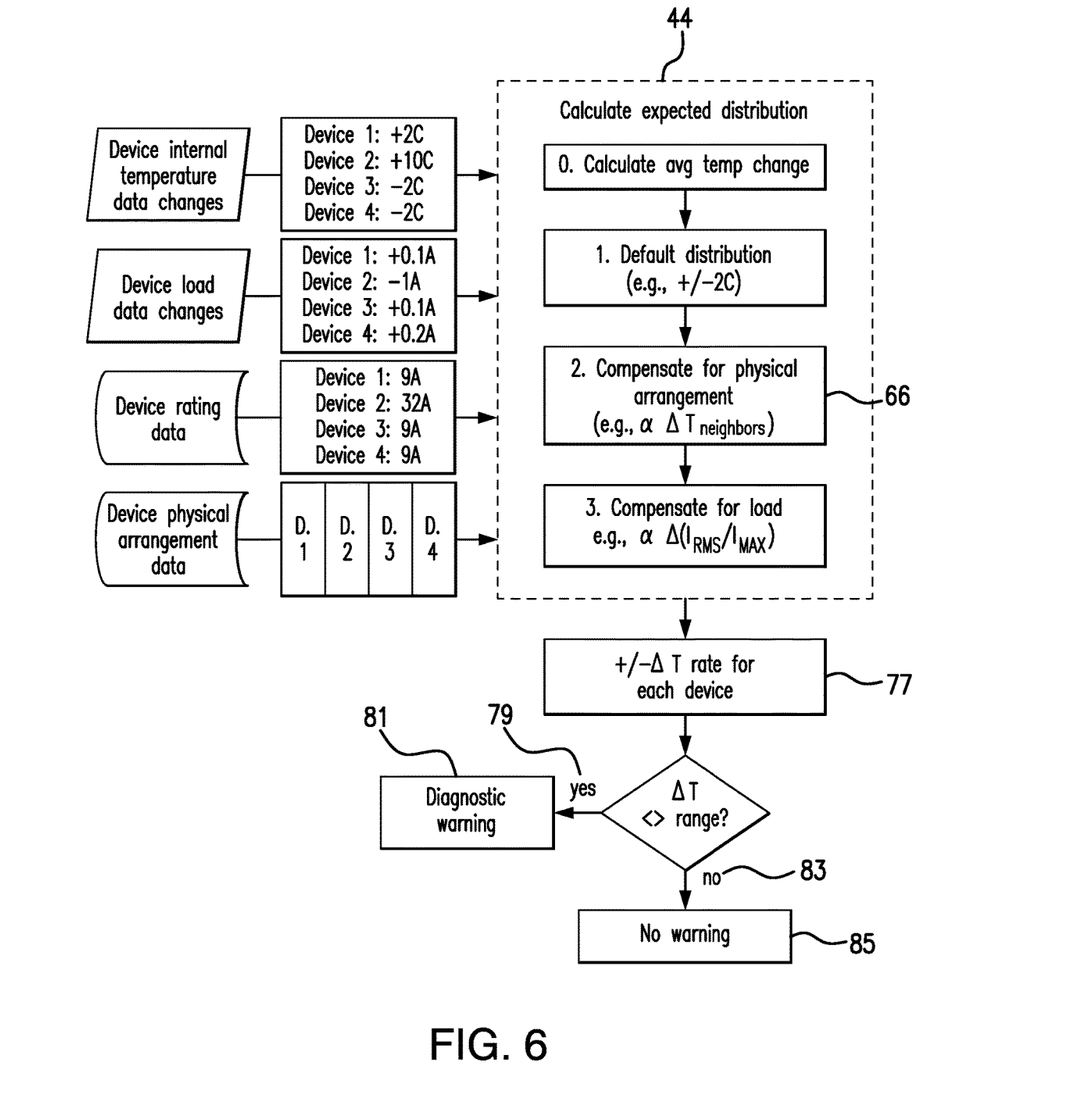
FIG. 6 is a block diagram of steps in third embodiment for obtaining an expected operating temperature range and issuing a diagnostic warning based on rate of temperature change.

FIG. 6 illustrates a third embodiment of the invention whereby the same data is collected as in the previous embodiment and the rate of temperature change 77 is also tracked as an indicator of starter system health. Load and Operating Temperature and rate of temperature change for the starter are periodically and routinely taken and compared to the recorded values for the starter and a range for rate of temperature change is developed 77. If the rate of change of the operating temperature is outside 79 of the normal range, a diagnostic warning 81 is issued to the operator of the starter island so that effective preventive maintenance or investigation may be begun. If the starter operating temperature is inside 83 of the correlation range, a diagnostic warning is not issued 85. This embodiment adds detection coverage for problems causing high rates of temperature change, but not necessarily temperatures that are out of range (e.g., an instantaneous drop of 20° C. may be within acceptable range, but indicates a need to check the function of the starter or control panel).

While particular aspects, implementations, and applications of the present disclosure have been illustrated and described, it is to be understood that the present disclosure is not limited to the precise construction and compositions disclosed herein and that various modifications, changes, and variations may be apparent from the foregoing descriptions without departing from the invention as defined in the appended claims.

The invention claimed is:

1. A method of performing temperature-based diagnostics for a motor starter grouped within a plurality of motor starters within a starter island; comprising:
   a) calculating an expected range of operating temperatures for the motor starter using recorded and accessed data including:
   b) measuring and recording internal operating temperatures of the motor starter in an electronic device associated with the plurality of motor starters, and calculating an average operating temperature for the motor starter;
   c) assigning an initial range of temperature values around the average operating temperature based on a given distribution range for the design of the motor starter;
   d) adjusting the initial range based on the physical location of the motor starter within the island to a second temperature range;
   e) adjusting the second temperature range to an expected temperature range based on the current draw data of the motor starter;
   f) periodically adjusting the expected temperature range of the motor starter based on a present average operating temperature and present current draw data for the motor starter;
   g) periodically measuring the motor starter temperature; and
   h) issuing a diagnostic alarm when a present measured temperature of a starter is outside of a present expected range of operating temperatures for the motor starter.

2. The method according to claim 1 wherein the expected temperature range is further adjusted according to a correlation of changes in starter temperature with changes in current draw through the starter over time, whereby if the starter temperature changes too much for a given load change, the diagnostic alarm is issued.

3. The method according to claim 1 wherein the expected temperature range is further adjusted according to a rate of change in starter temperature over elapsed time whereby if temperature rate of change is too rapid the diagnostic alarm is issued.

4. The method according to claim 1 wherein an expected temperature range is calculated for each of the plurality of motor starters within the starter island.

5. The method according to claim 1 wherein the step of adjusting the initial range based on the physical location of the motor starter within the island to the second temperature range further includes: adjusting the temperature range based upon known temperatures or temperature changes of other motor starters grouped within the plurality of motor starters.

6. The method according to claim 5 wherein the expected temperature range is further adjusted according to a correlation of changes in starter temperature with changes in current draw through the starter over time, whereby if the starter temperature changes too much for a given load change, the diagnostic alarm is issued.

7. The method according to claim 5 wherein the expected temperature range is further adjusted according to a rate of change in starter temperature over elapsed time whereby if temperature rate of change is too rapid the diagnostic alarm is issued.

8. The method according to claim 1 wherein the step of adjusting the initial range based on the physical location of the motor starter within the island to the second temperature range further includes: adjusting the temperature range based upon known current draw or current draw changes of other motor starters grouped within the plurality of motor starters.

9. The method according to claim 8 wherein the expected temperature range is further adjusted according to a correlation of changes in starter temperature with changes in current draw through the starter over time, whereby if the starter temperature changes too much for a given load change, the diagnostic alarm is issued.

10. The method according to claim 8 wherein the expected temperature range is further adjusted according to a rate of change in starter temperature over elapsed time whereby if temperature rate of change is too rapid the diagnostic alarm is issued.

\* \* \* \* \*